US012771030B2

(12) United States Patent
Choi et al.

(10) Patent No.: US 12,771,030 B2
(45) Date of Patent: Oct. 20, 2026

(54) MULTIBAND DIPLEXER AND BROADBAND ANTENNA COMPRISING SAME

(71) Applicant: INTELLIAN TECHNOLOGIES, INC., Pyeongtaek-si (KR)

(72) Inventors: Woo Chang Choi, Osan-si (KR); Seung Woong Choi, Hwaseong-si (KR)

(73) Assignee: INTELLIAN TECHNOLOGIES, INC., Pyeongtaek-si (KR)

( * ) Notice: Subject to any disclaimer, the term of this patent is extended or adjusted under 35 U.S.C. 154(b) by 119 days.

(21) Appl. No.: 18/683,691

(22) PCT Filed: Jun. 8, 2022

(86) PCT No.: PCT/KR2022/008079
§ 371 (c)(1),
(2) Date: Feb. 14, 2024

(87) PCT Pub. No.: WO2023/022341
PCT Pub. Date: Feb. 23, 2023

(65) Prior Publication Data
US 2024/0372257 A1 Nov. 7, 2024

(30) Foreign Application Priority Data
Aug. 19, 2021 (KR) ........................ 10-2021-0109516

(51) Int. Cl.
*H01Q 5/55* (2015.01)
*H01P 3/06* (2006.01)
*H01Q 13/02* (2006.01)
*H01Q 15/14* (2006.01)

(52) U.S. Cl.
CPC ................. *H01Q 5/55* (2015.01); *H01P 3/06* (2013.01); *H01Q 13/02* (2013.01); *H01Q 15/14* (2013.01)

(58) Field of Classification Search
None
See application file for complete search history.

(56) References Cited

U.S. PATENT DOCUMENTS 5,227,744 A * 7/1993 Sabatier .................. H01P 5/103
333/34
7,659,861 B2 2/2010 Jan
(Continued)

FOREIGN PATENT DOCUMENTS

CN 102610921 A * 7/2012
CN 106785469 A * 5/2017 ............. H01Q 15/24
(Continued)

OTHER PUBLICATIONS

Diplexer vs. Duplexer: Key Differences and Applications Explained, Captured from Wayback Machine on Jun. 18, 2025, RFWirelessWorld Website https://www.rfwireless-world.com/terminology/diplexer-vs-duplexer (Year: 2025).*
(Continued)

*Primary Examiner* — Dameon E Levi
*Assistant Examiner* — Anh Ho
(74) *Attorney, Agent, or Firm* — MOSER TABOADA

(57) ABSTRACT

A multiband diplexer for an antenna to separate a multiband wireless signal includes a first signal passing unit connected to a side of a single feed horn of the antenna and configured to pass a first band signal and a second signal passing unit positioned coaxially with the first signal passing unit and configured to pass a second band signal, and the multiband diplexer is configured to separate the first band signal and the second band signal from a signal received by the single feed horn, in which at least one of the first signal passing unit and the second signal passing unit is configured to suppress a higher order mode.

9 Claims, 11 Drawing Sheets

(56) References Cited

U.S. PATENT DOCUMENTS

| | | | | |
|---|---|---|---|---|
| 9,520,637 | B2 | 12/2016 | Monte et al. | |
| 2002/0175875 | A1* | 11/2002 | Verstraeten | H01P 1/161 343/786 |
| 2006/0000274 | A1* | 1/2006 | Kallsand | G01F 23/284 73/290 V |
| 2011/0254640 | A1* | 10/2011 | Gehring | H01P 1/2138 333/137 |
| 2017/0324164 | A1* | 11/2017 | Cook | H01Q 5/47 |
| 2020/0403312 | A1* | 12/2020 | Guan | H01Q 19/19 |
| 2021/0265740 | A1* | 8/2021 | Mitchelson | H01Q 5/47 |

FOREIGN PATENT DOCUMENTS

| | | | |
|---|---|---|---|
| CN | 107546475 | B * | 12/2019 |
| EP | 1142062 | B1 | 3/2005 |
| EP | 2903081 | B1 | 12/2019 |
| JP | 2017-152938 | A | 8/2017 |
| KR | 10-2006-0012527 | A | 2/2006 |
| KR | 10-0561634 | B1 | 3/2006 |
| KR | 10-2009-0105441 | A | 10/2009 |
| KR | 10-1264768 | B1 | 5/2013 |
| KR | 10-1444659 | B1 | 9/2014 |
| KR | 10-1576260 | B1 | 12/2015 |
| KR | 10-1757681 | B | 7/2017 |

OTHER PUBLICATIONS

International Search Report for PCT/KR2022/008079 dated Sep. 13, 2022.

Supplementary European Search Report for Application No. 22858583.2 dated Aug. 11, 2025.

* cited by examiner

MULTIBAND DIPLEXER AND BROADBAND ANTENNA COMPRISING SAME

TECHNICAL FIELD

The following description relates to a multiband diplexer and a broadband antenna including the multiband diplexer. Specifically, the following description relates to a multiband diplexer, which transmits and receives a dual band wireless signal by a single feed horn device and separates such a signal, and a broadband antenna including the multiband diplexer.

BACKGROUND ART

Polarization is a phenomenon in which an electric field vibrates in a certain direction in an electromagnetic wave, and the electric field may also rotate, besides vibrating in a one-dimensional linear direction. An electromagnetic wave is a type of wave that is propagated while an electric field and a magnetic field vibrate. The direction in which the electric field and the magnetic field vibrate is perpendicular to the traveling direction of the electromagnetic wave.

A polarizer is an electromagnetic passive element that responds to and absorbs only components that vibrate in the same direction in an incident electromagnetic wave and lets other components pass through.

An antenna is a device configured to transmit and receive a wave of a set band. Typically, a plurality of antennas is required to transmit and receive a plurality of waves each having a different band. However, using the plurality of antennas may increase space inefficiency and costs and cause difficulties in maintenance or repair. Accordingly, a single antenna including a plurality of transceivers each having a different band is being developed.

Korean Patent Publication No. 10-1757681 discloses a satellite communication antenna capable of receiving multiband signals. The antenna disclosed in the present application is configured to transmit and receive different bands by adjusting the orientation of a sub-reflecting board while a plurality of feed horns is installed fixedly in a main reflecting board.

The above description is information the inventor(s) acquired during the course of conceiving the present disclosure, or already possessed at the time, and was not necessarily publicly known before the present application was filed.

DISCLOSURE OF THE INVENTION

Technical Goals

An aspect provides a multiband diplexer, which transmits and receives a dual band wireless signal by a single feed horn device and separates such a signal, for satellite communication and a broadband antenna including the multiband diplexer.

Another aspect also provides a multiband diplexer, which is positioned in the rear of a feed horn, includes crease elements, step elements, stepped elements, and protruding elements, and is configured to separate a dual band wireless signal and suppress a higher order mode by using a multiband diplexer, and a broadband antenna including the multiband diplexer.

The technical aspects obtainable from the present disclosure are non-limited by the above-mentioned technical aspects. And other unmentioned technical aspects can be clearly understood from the following description by those having ordinary skill in the technical field to which the present disclosure pertains.

Technical Solutions

According to an aspect, a multiband diplexer for an antenna to separate a multiband wireless signal includes a first signal passing unit connected to a side of a single feed horn of the antenna and configured to pass a first band signal and a second signal passing unit positioned coaxially with the first signal passing unit and configured to pass a second band signal, and the multiband diplexer is configured to separate the first band signal and the second band signal from a signal received by the single feed horn, in which at least one of the first signal passing unit and the second signal passing unit is configured to suppress a higher order mode.

The second signal passing unit may include a dielectric body and a second band signal higher order mode suppression member included in a front end of the dielectric body.

The second band signal higher order mode suppression member may include a plurality of crease elements, in which the plurality of crease elements has a height incremental from a front end to a rear end.

The second band signal higher order mode suppression member may further include a plurality of step elements positioned outside the plurality of crease elements and inside a circular waveguide.

The first signal passing unit may include a coaxial waveguide positioned coaxially around the second signal passing unit and a second band signal suppression member inside the coaxial waveguide.

The second band signal suppression member may include a plurality of stepped elements, in which the plurality of stepped elements protrudes from an outside of the coaxial waveguide to an inside of the coaxial waveguide and has a height decremental from a front end to a rear end.

The second band signal suppression member may include a plurality of protruding elements, in which the plurality of protruding elements is around the dielectric body and protrudes from an inside of the coaxial waveguide to an outside of the coaxial waveguide.

According to another aspect, a broadband antenna includes a reflecting board, a single feed horn positioned in a front end of the reflecting board, and a multiband diplexer connected to the single feed horn, in which the multiband diplexer includes a first signal passing unit connected to a side of the single feed horn and configured to pass a first band signal and a second signal passing unit positioned coaxially with the first signal passing unit and configured to pass a second band signal, and the multiband diplexer is configured to separate the first band signal and the second band signal from a signal received by the single feed horn and is positioned in a rear end of the reflecting board.

The second signal passing unit may include a dielectric body and a second band signal higher order mode suppression member included in a front end of the dielectric body and configured to suppress a higher order mode of the second band signal, in which the second band signal higher order mode suppression member may further include a plurality of crease elements and a plurality of step elements positioned outside the plurality of crease elements and inside a circular waveguide, in which the plurality of crease elements has a height incremental from a front end to a rear end.

The first signal passing unit may include a coaxial waveguide positioned coaxially around the second signal passing unit and a second band signal suppression member inside the coaxial waveguide and configured to suppress a higher order mode of the first band signal.

The second band signal suppression member may include a plurality of stepped elements and a plurality of protruding elements, in which the plurality of stepped elements protrudes from an outside of the coaxial waveguide to an inside of the coaxial waveguide and has a height decremental from a front end to a rear end, and the plurality of protruding elements is around the dielectric body and protrudes from an inside of the coaxial waveguide to an outside of the coaxial waveguide.

Effects

According to an aspect, there is provided a multiband diplexer, which transmits and receives a dual band wireless signal by a single feed horn device and separates such a signal, for satellite communication and a broadband antenna including the multiband diplexer.

According to another aspect, there is also provided a multiband diplexer, which is positioned in the rear of a feed horn, includes crease elements, step elements, stepped elements, protruding elements, and is configured to separate a dual band wireless signal and suppress a higher order mode by using a multiband diplexer, and a broadband antenna including the multiband diplexer.

The effects of a multiband diplexer and a broadband antenna including the multiband diplexer according to an embodiment may not be limited to the above-mentioned effects, and other unmentioned effects may be clearly understood from the following description by one of ordinary skill in the art.

Figure 1:
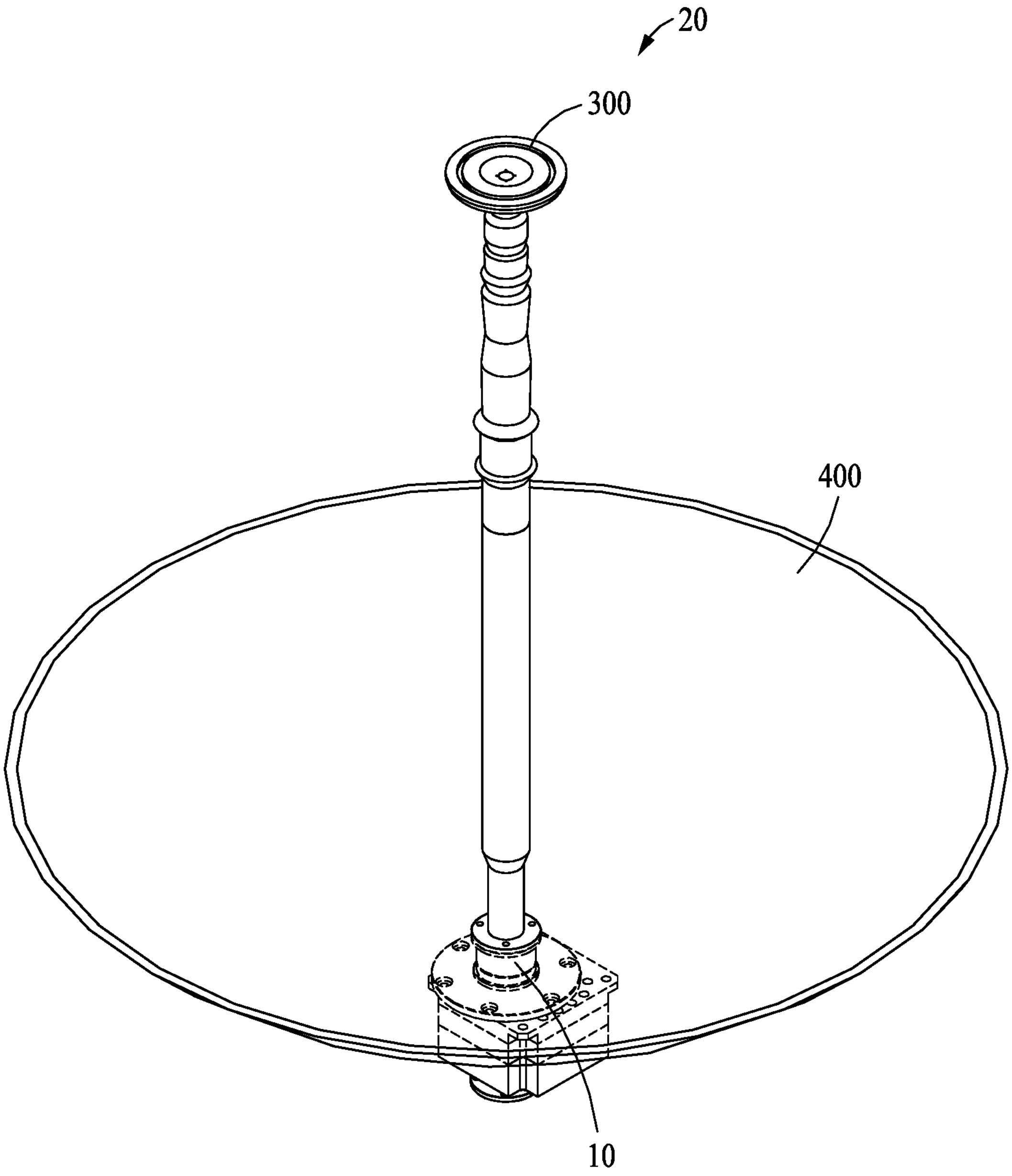
FIG. 1 is a perspective view illustrating a multiband diplexer and a broadband antenna including the multiband diplexer according to an embodiment.
Figure 2A:
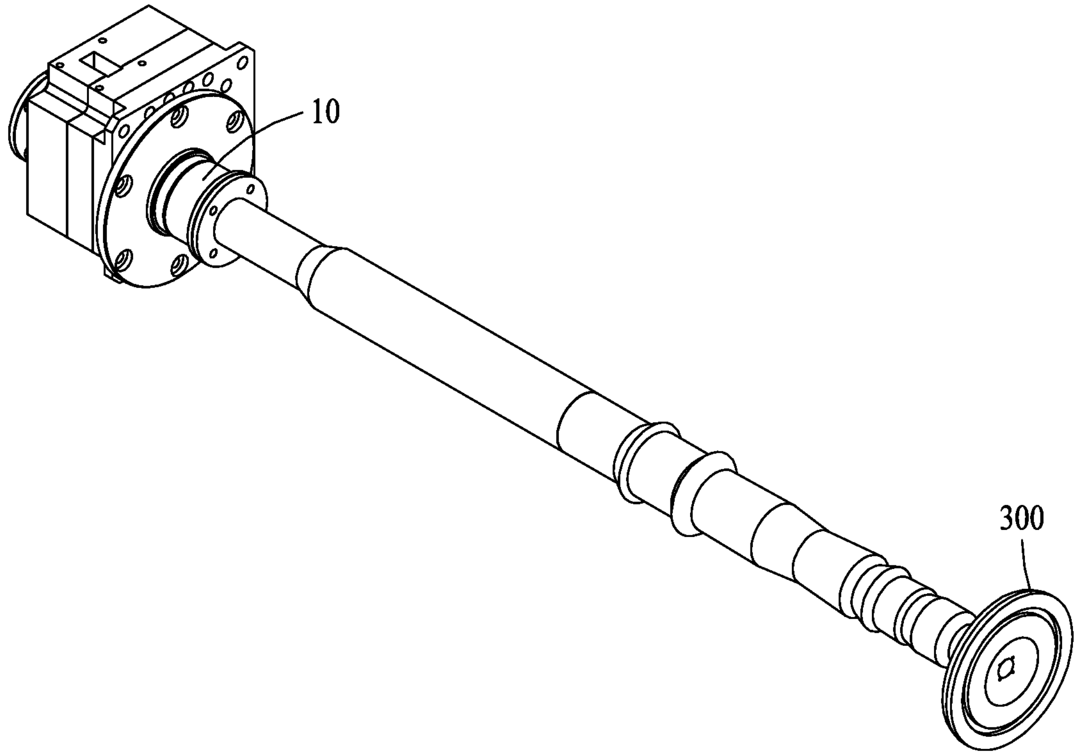
FIGS. 2A and 2B are respectively a perspective view and a side view each illustrating a single feed horn and the multiband diplexer according to an embodiment.
Figure 2B:
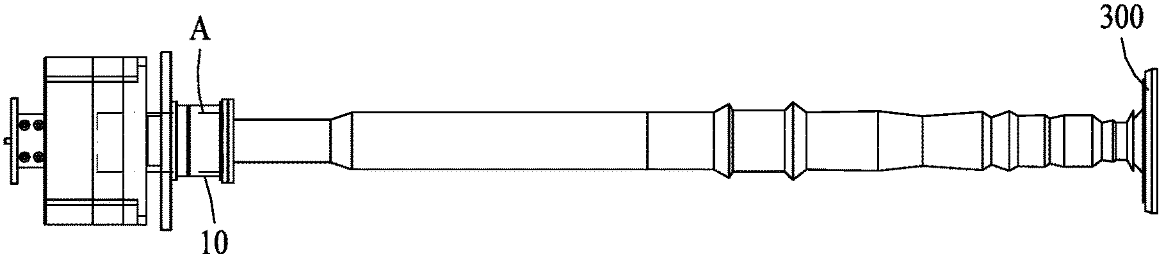

The accompanying drawings illustrate preferred embodiments of the present invention and are provided together with the detailed description for better understanding of the technical idea of the present invention. Therefore, the present invention should not be construed as being limited to the embodiments set forth in the drawings.

BEST MODE FOR CARRYING OUT THE INVENTION

Hereinafter, embodiments are described in detail with reference to the accompanying drawings. However, various alterations and modifications may be made to the embodiments. Here, the embodiments are not construed as limited to the disclosure. The embodiments should be understood to include all changes, equivalents, and replacements within the idea and the technical scope of the disclosure.

The terminology used herein is for the purpose of describing particular embodiments only and is not to be limiting of the embodiments. The singular forms “a”, “an”, and “the” are intended to include the plural forms as well, unless the context clearly indicates otherwise. It will be further understood that the terms “comprises/comprising” and/or “includes/including” when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

When describing the embodiments with reference to the accompanying drawings, like reference numerals refer to like constituent elements and a repeated description related thereto will be omitted. In the description of embodiments, detailed description of well-known related structures or functions will be omitted when it is deemed that such description will cause ambiguous interpretation of the present disclosure.

Also, in the description of the components, terms such as first, second, A, B, (a), (b) or the like may be used herein when describing components of the present disclosure. These terms are used only for the purpose of discriminating one constituent element from another constituent element, and the nature, the sequences, or the orders of the constituent elements are not limited by the terms. When one constituent element is described as being “connected”, “coupled”, or “attached” to another constituent element, it should be understood that one constituent element can be connected or attached directly to another constituent element, and an intervening constituent element can also be “connected”, “coupled”, or “attached” to the constituent elements.

The same name may be used to describe an element included in the embodiments described above and an element having a common function. Unless otherwise mentioned, the descriptions on the embodiments may be applicable to the following embodiments, and thus duplicated descriptions will be omitted for conciseness.

FIG. 1 is a perspective view illustrating a multiband diplexer 10 and a broadband antenna 20 including the multiband diplexer 10, according to an embodiment; FIGS.

Figure 3:
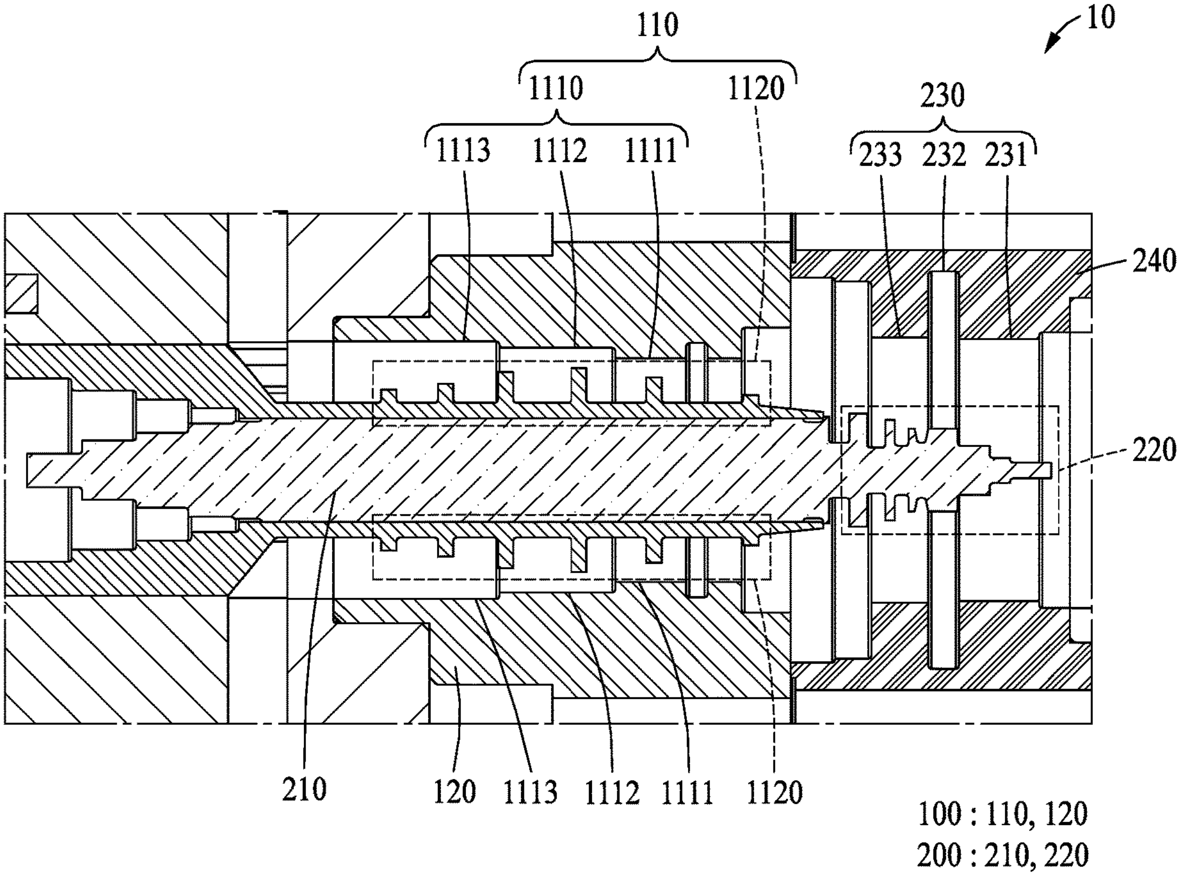
FIG. 3 is an enlarged cross-sectional view illustrating the multiband diplexer according to an embodiment.

2A and 2B are respectively a perspective view and a side view each illustrating a single feed horn 300 and the multiband diplexer 10 according to an embodiment; FIG. 3 an enlarged cross-sectional view illustrating the multiband diplexer 10 according to an embodiment; and FIG. 4 is a diagram illustrating a second signal passing unit 200 of the multiband diplexer 10 and a plurality of protruding elements 1120 of the multiband diplexer 10 according to an embodiment.

Referring to FIGS. 1 to 4, the broadband antenna 20 according to an embodiment may include a reflecting board 400, the single feed horn 300 positioned in the front of the reflecting board 400, and the multiband diplexer 10 connected to the single feed horn 300. According to an embodiment, the multiband diplexer 10 for an antenna to separate a multiband wireless signal may include a first signal passing unit 100 connected to a side of the single feed horn 300 of the broadband antenna 20 and configured to pass a first band signal and the second signal passing unit 200 positioned coaxially with the first signal passing unit 100 and configured to pass a second band signal.

The multiband diplexer 10 may also be referred to as a broadband orthogonal mode polarization separator and may separate the first band signal and the second band signal from a signal received by the single feed horn 300. In addition, at least one of the first signal passing unit 100 and the second signal passing unit 200 may be configured to suppress a higher order mode. Specifically, the single feed horn 300 may receive a multiband signal, and the multiband diplexer 10 may separate and process the received multiband signal. The broadband antenna 20 disclosed herein may be configured to transmit and receive Ku band and Ka band signals, and the multiband diplexer 10 may be configured to separate the Ku band and Ka band signals. The multiband diplexer 10 may be positioned in the rear of the reflecting board 400 such that the single feed horn 300 may be applied in various forms. The single feed horn 300 may be positioned in the front of the reflecting board 400. The single feed horn 300 and the multiband diplexer 10 may be spaced apart from each other at a certain distance, may be connected to each other through a pipe, and may each be positioned near the reflecting board 400.

Figure 4:
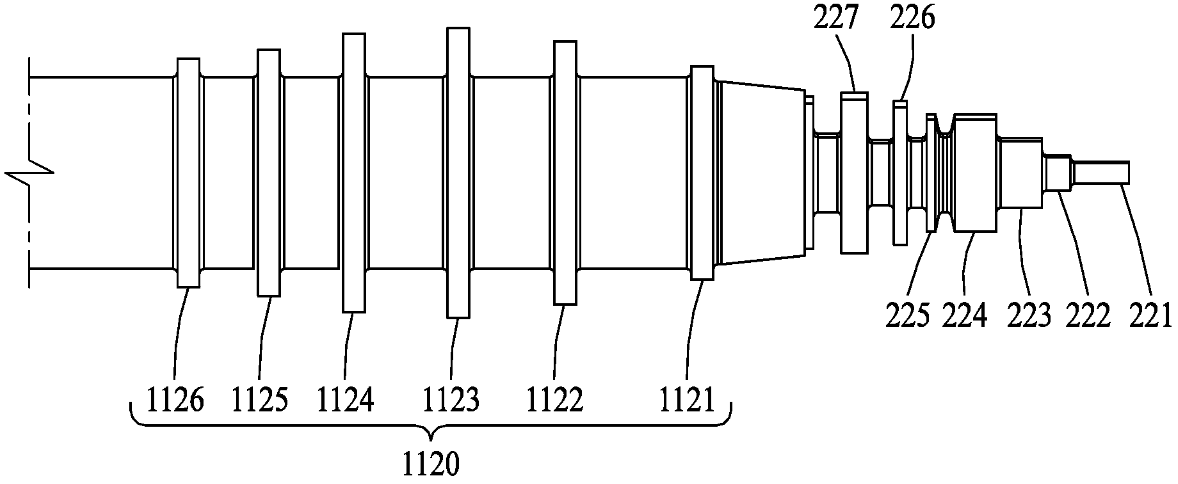
FIG. 4 is a diagram illustrating a second signal passing unit of the multiband diplexer and a plurality of protruding elements of the multiband diplexer according to an embodiment.

As illustrated in FIGS. 3 and 4, the second signal passing unit 200 may include a dielectric body 210 and a second band signal higher order mode suppression member 220 included in the front of the dielectric body 210. In addition, the second band signal higher order mode suppression member 220 may include a plurality of crease elements 221 to 227, in which the plurality of crease elements 221 to 227 has a height incremental from the front to the rear. Specifically, the plurality of crease elements 221 to 227 may include a first crease element 221, a second crease element 222, a third crease element 223, a fourth crease element 224, a fifth crease element 225, a sixth crease element 226, and a seventh crease element 227. The number of crease elements are not limited to the number of the plurality of crease elements stated above and may vary. The second crease element 222 may have a higher height (a greater diameter) than that of the first crease element 221, the third crease element 223 may have a higher height than that of the second crease element 222, and the fourth crease element 224 may have a higher high than that of the third crease element 223. In addition, the fifth crease element 225 may have the same height as that of the fourth crease element 224, the sixth crease element 226 may have a higher height than that of the fifth crease element 225, and the seventh crease element 227 may have a higher height than that of the sixth crease element 226. The height stated above may refer to a height of a side viewed from an axis, and a high height may be construed as a great diameter of a crease element. The thickness of each crease element may vary depending on designs, and the plurality of crease elements 221 to 227 according to an embodiment may be set to have different thicknesses.

In addition, the second band signal higher order mode suppression member 220 may be positioned outside the plurality of crease elements 221 to 227 and may further include a plurality of step elements 230 positioned inside a circular waveguide 240. The plurality of step elements 230 may include a first step element 231, a second step element 232, and a third step element 233. The plurality of step elements 230 may be positioned to surround the plurality of crease elements 221 to 227 and may be positioned on the circular waveguide 240. Each of the first, second, and third step elements 231 to 233 may be set to have a different height. The first step element 231 and the third step element 233 may have similar heights, and the second step element 232 may be between the first step element 231 and the third step element 233 and may have a lower height than the heights of the first step element 231 and the third step element 233. In this case, the height stated above may be a height of a side viewed from an axis, and a lower height may be construed as a greater diameter of a groove (a hollow space). Accordingly, the second signal passing unit 200 may pass the Ka band signal (the second band signal) and suppress a Ka band signal higher order mode.

Referring to FIGS. 3 and 4 again, the first signal passing unit 100 may include a coaxial waveguide 120 positioned coaxially around the second signal passing unit 200 and a second band signal suppression member 110 inside the coaxial waveguide 120. The coaxial waveguide 120 may be connected to the circular waveguide 240. In addition, the second band signal suppression member 110 may include a plurality of stepped elements 1110, and first, second, and third stepped elements 1111, 1112, and 1113 may protrude from the outside to inside of the coaxial waveguide 120 and may have a height decremental from the front to the rear. Specifically, the plurality of stepped elements 1110 may include the first stepped element 1111, the second stepped element 1112, and the third stepped element 1113. The plurality of stepped elements 1110 may surround the plurality of protruding elements 1120 around the dielectric body 210. In addition, a choke member may be in the front of the first stepped element 1111, and the choke member may surround a first protruding element 1121. In addition, there may be several stepped layers to surround the plurality of crease elements 221 to 227. The second stepped element 1112 has a lower height than that of the first stepped element 1111, and the third stepped element 1113 may have a lower height than that of the second stepped element 1112. In this case, the heights stated above may each be a height of a side viewed from an axis, and a lower height may be construed as a greater diameter of a groove (a hollow space).

In addition, the second band signal suppression member 110 may include the plurality of protruding elements 1120, and the plurality of protruding elements 1120 may be around the dielectric body 210 and may protrude from the inside to outside of the coaxial waveguide 120. Specifically, the plurality of protruding elements 1120 may include a first protruding element 1121, a second protruding element 1122, a third protruding element 1123, a fourth protruding element 1124, a fifth protruding element 1125, and a sixth protruding element 1126. The first protruding element 1121 may be within the length of the choke member, the second protruding element 1122 may be within the length of the first stepped element 1111, the third protruding element 1123 and the fourth protruding element 1124 may be within the second stepped element 1112, and the fifth protruding element 1125 and the sixth protruding element 1126 may be within the length of the third stepped element 1113. The height (or diameter) of each protruding element may be different and may vary depending on the purpose of the design. In addition, the number of protruding elements is not limited to the number of the plurality of protruding elements 1120 and may be changed, and the length, thickness, or shape of protruding elements may also vary depending on the designs. Accordingly, the first signal passing unit 100 may pass the Ku band signal (the first band signal) and suppress a Ka band signal (a basic mode or a higher order mode) or other unnecessary signals.

Figure 5A:
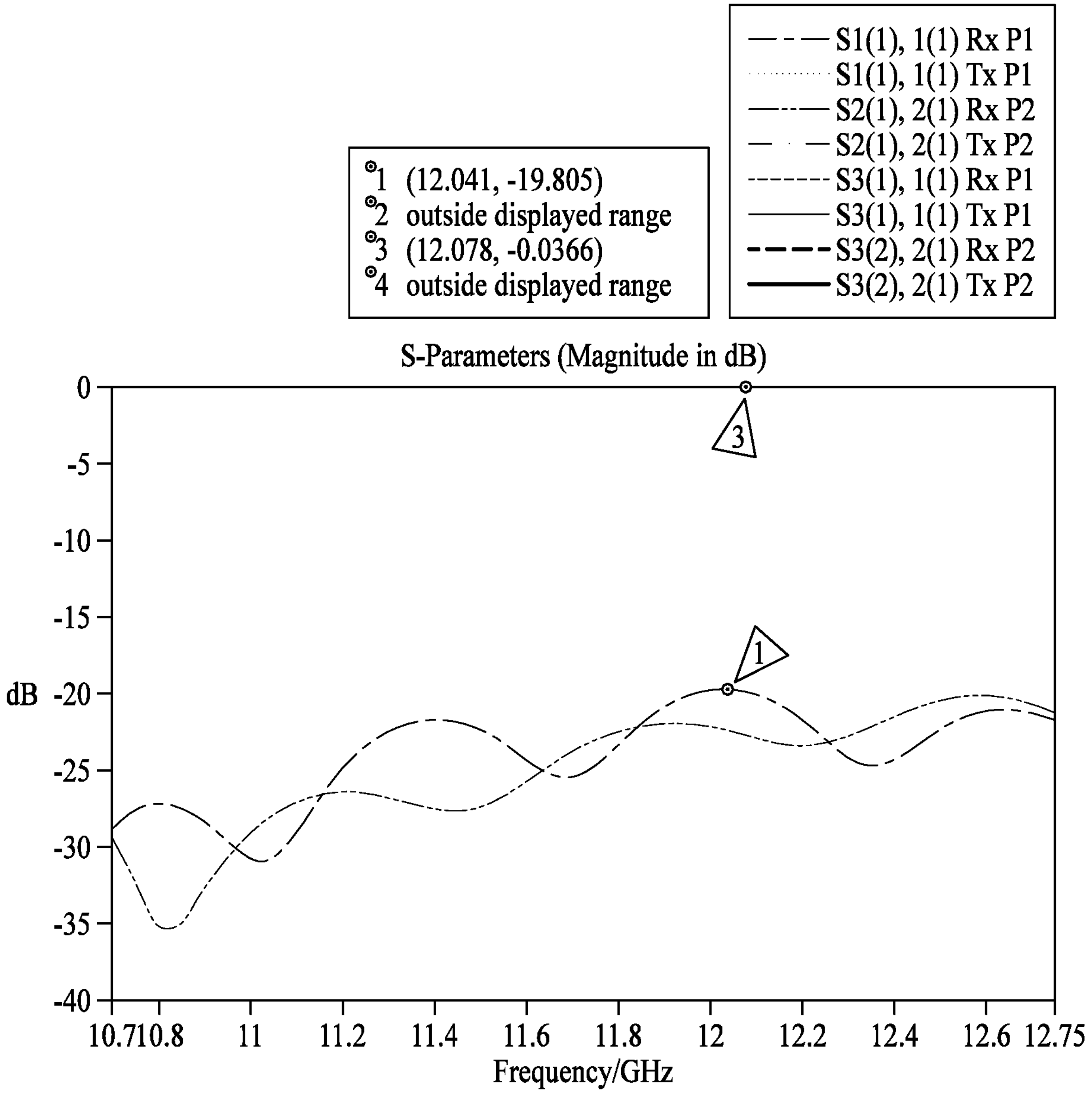
FIGS. 5A and 5B each are a graph showing a simulation result of Rx and Tx of a basic mode of a first band signal (Ku band) of the multiband diplexer according to an embodiment.
Figure 5B:
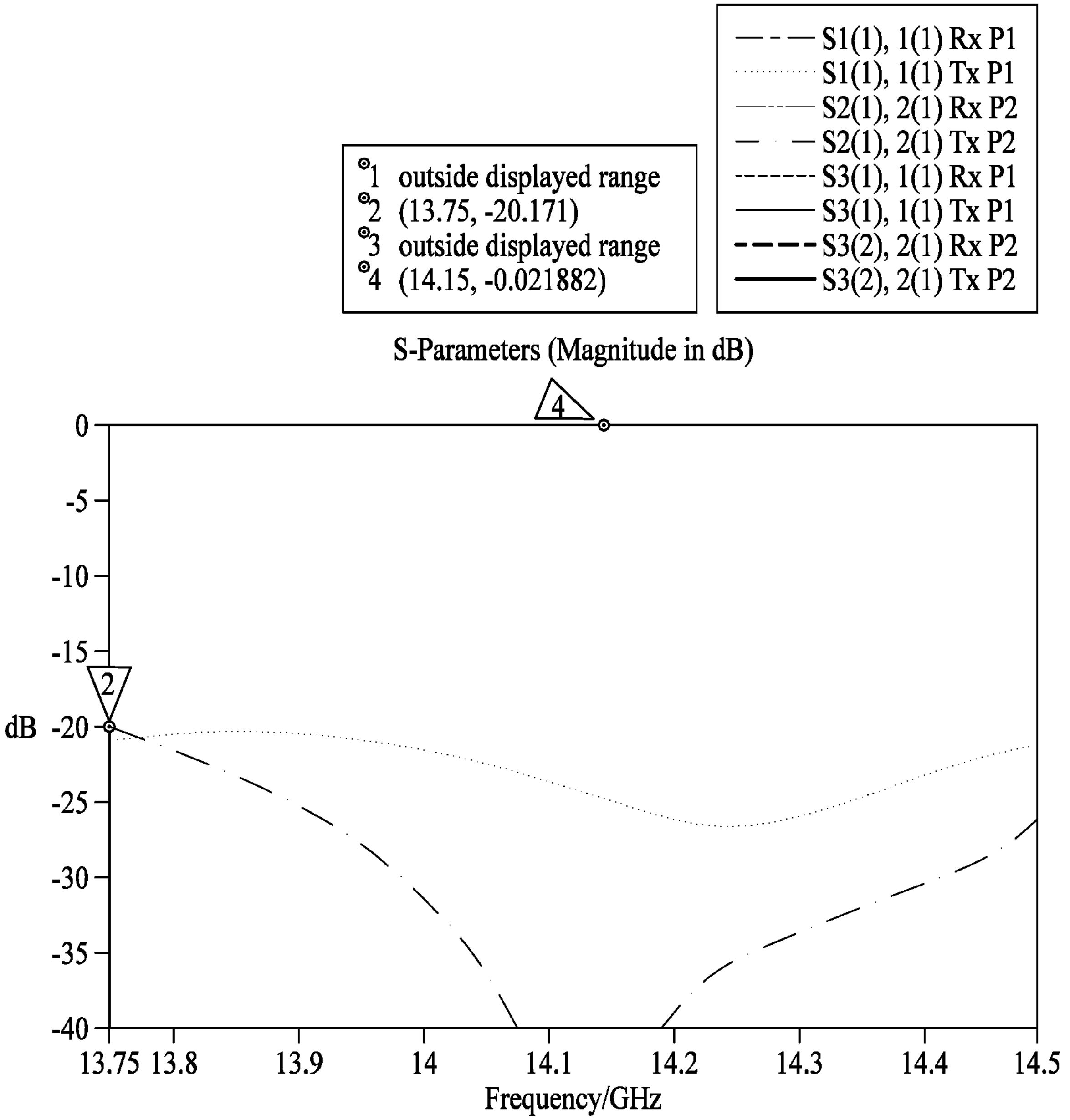
Figure 6A:
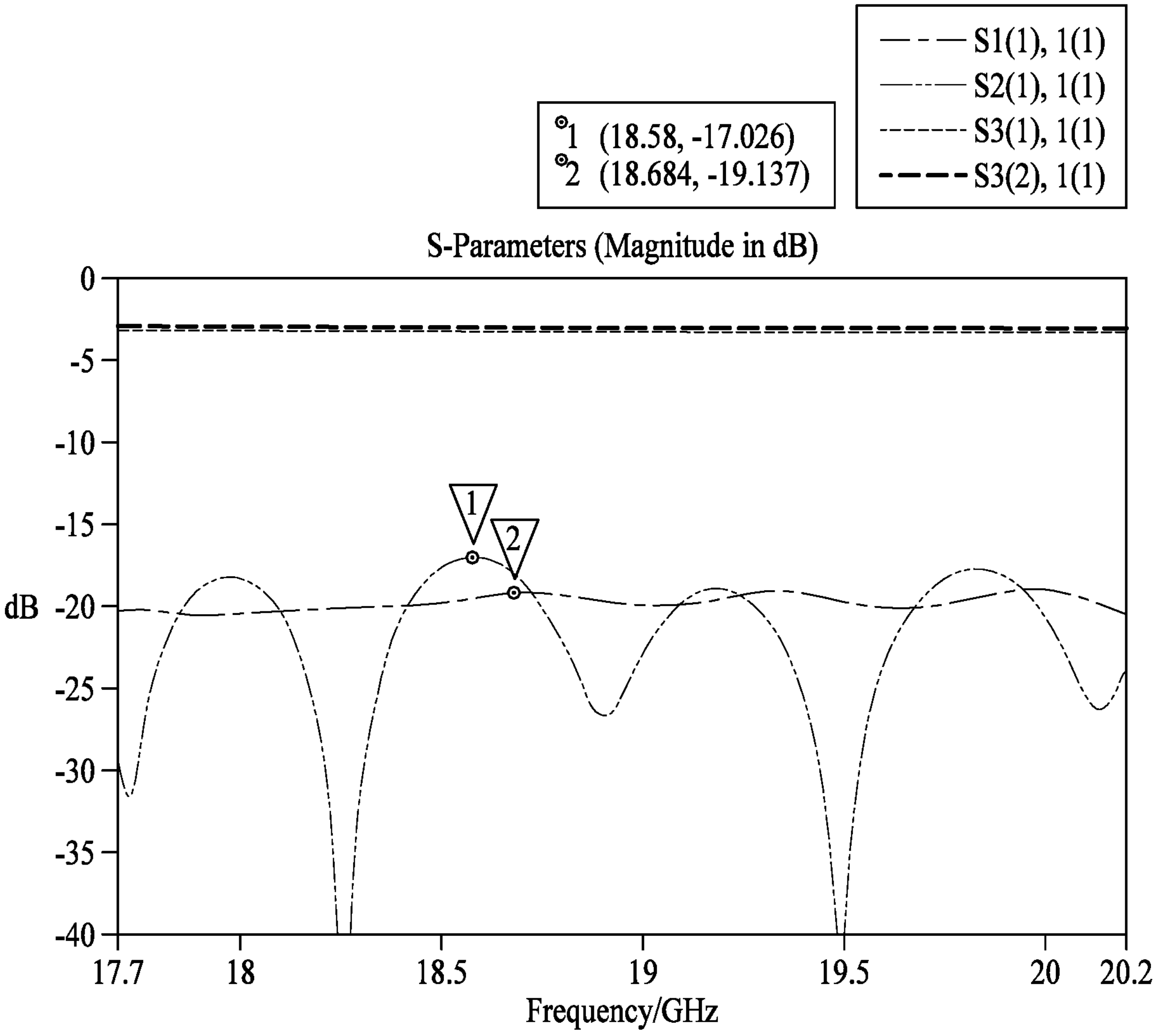
FIGS. 6A and 6B each are a graph showing a simulation result of Rx and Tx of a basic mode of a second band signal (Ka band) of the multiband diplexer according to an embodiment.
Figure 6B:
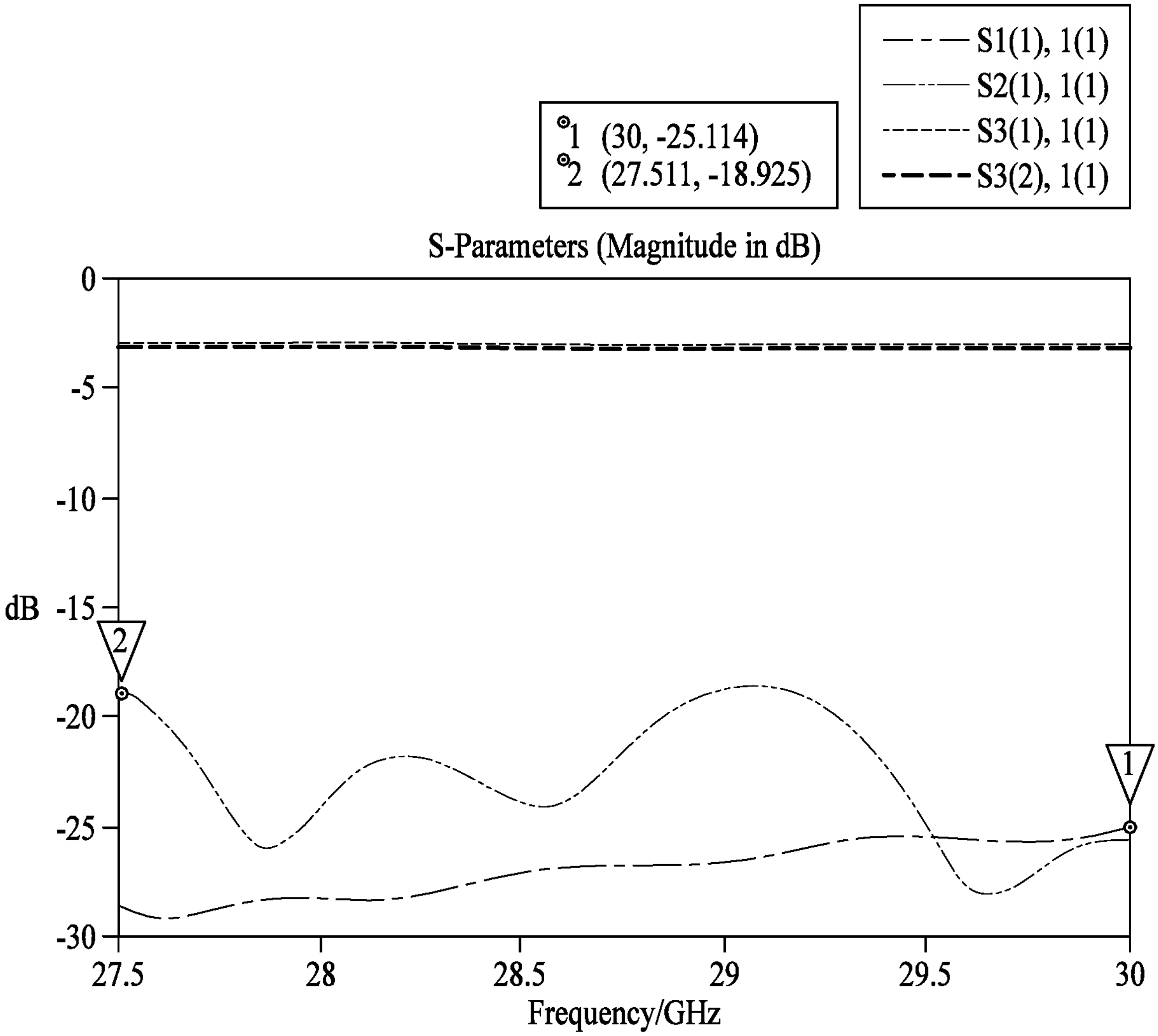

FIGS. 5A and 5B each are a graph showing a simulation result of Rx and Tx of a basic mode of a first band signal (Ku band) of the multiband diplexer 10 according to an embodiment; and FIGS. 6A and 6B each are a graph showing a simulation result of Rx and Tx of a basic mode of a second band signal (Ka band) of the multiband diplexer 10 according to an embodiment. In this case, values expressed by a return loss, isolation, and an insertion loss may be results in a basic mode and may be improved or maintained by a higher order mode suppression member.

Figure 7:
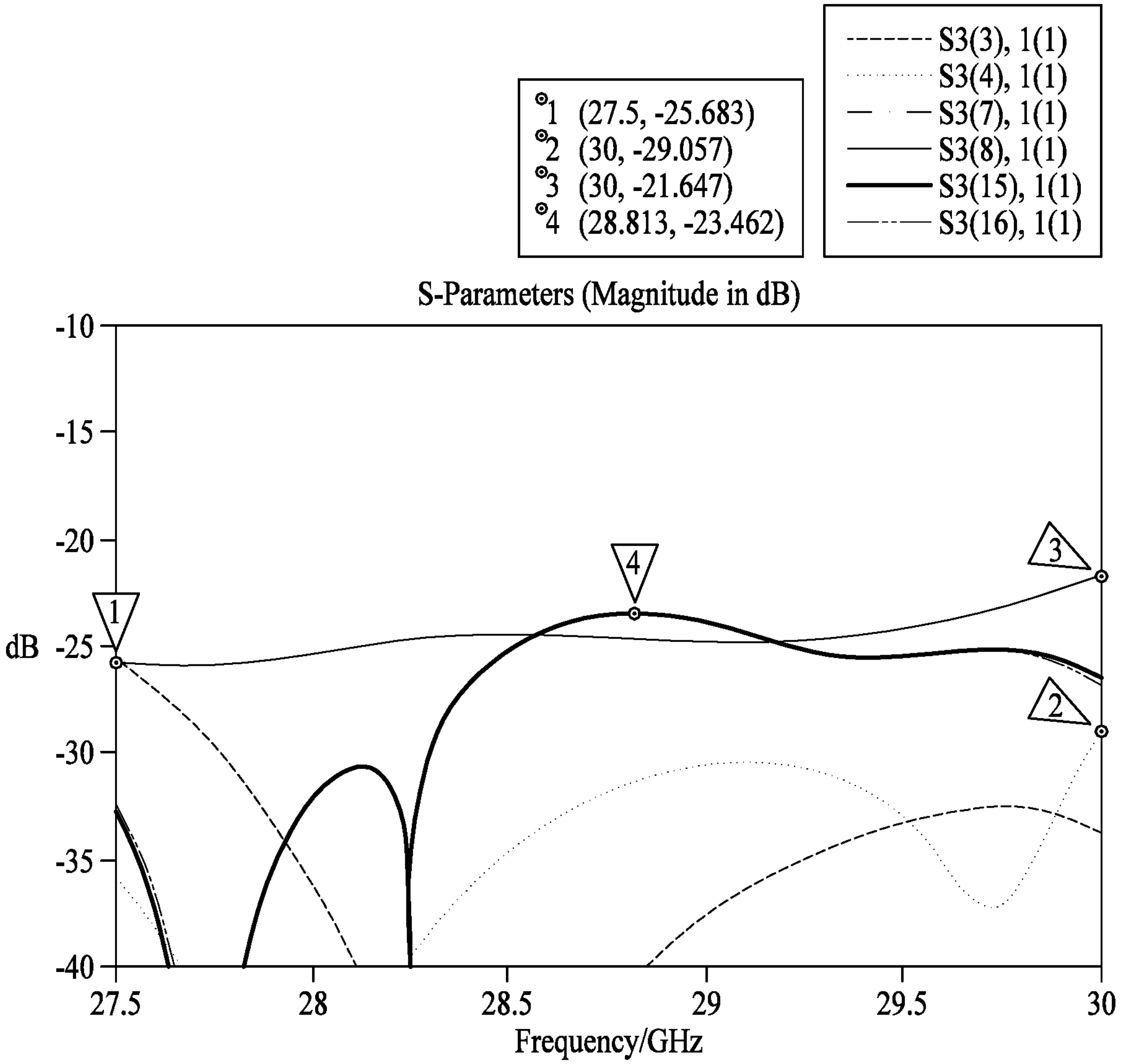
FIG. 7 is a graph showing a simulation result of a higher order mode of a second band signal (Ka band) of the multiband diplexer according to an embodiment.

FIG. 7 is a graph showing a simulation result of a higher order mode of a second band signal (Ka band) of the multiband diplexer 10 according to an embodiment. It is shown that all components of the higher order mode may be set to −20 dB or less while maintaining a basic mode of Ku band and Ka band by applying the multiband diplexer 10, and accordingly, the impact of the higher order mode on a pattern of the broadband antenna 20 may be minimized.

Figure 8:
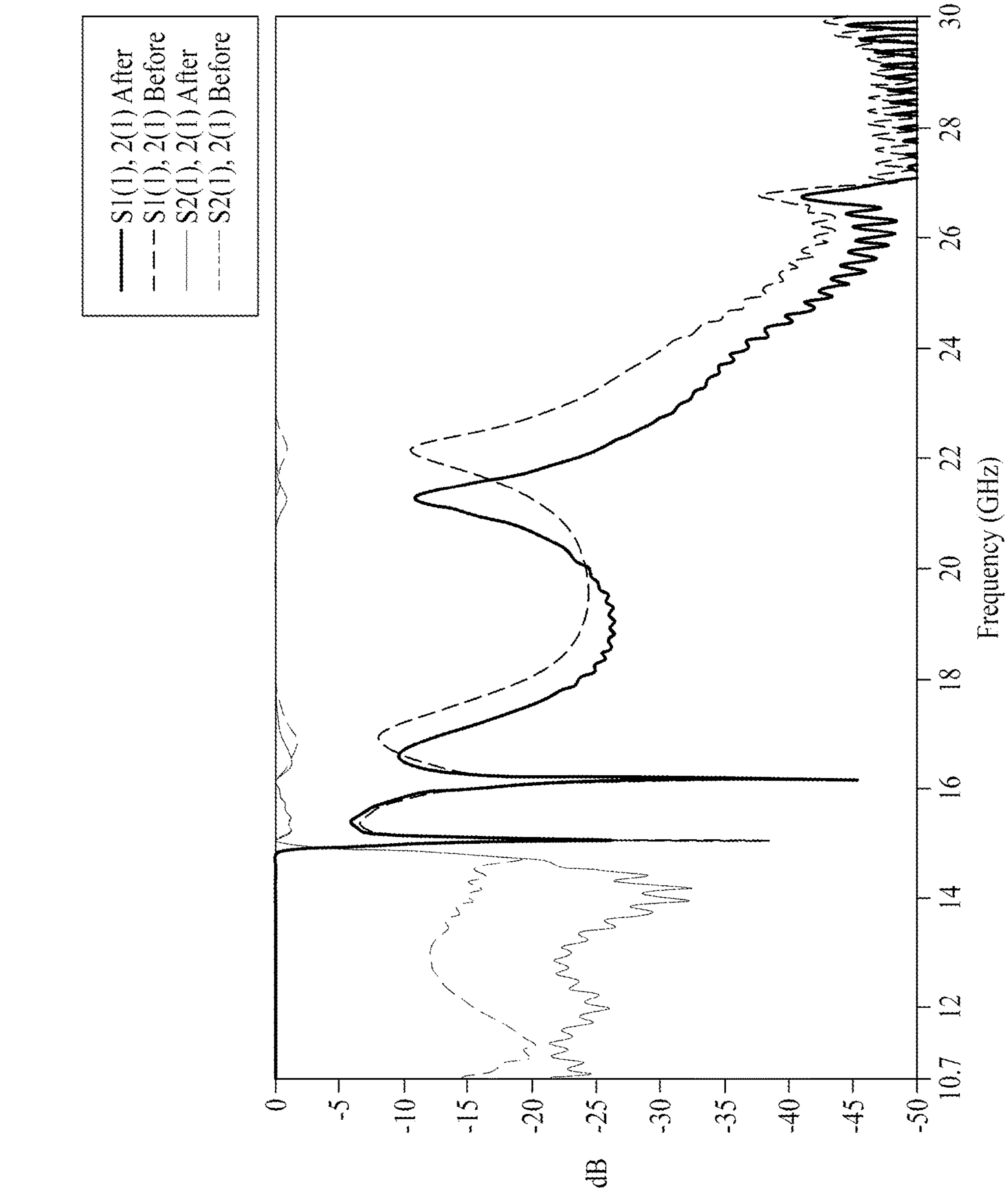
FIG. 8 is a graph showing a simulation result of improving second signal suppression entering a first signal passing unit of the multiband diplexer according to an embodiment.
Figure 9:
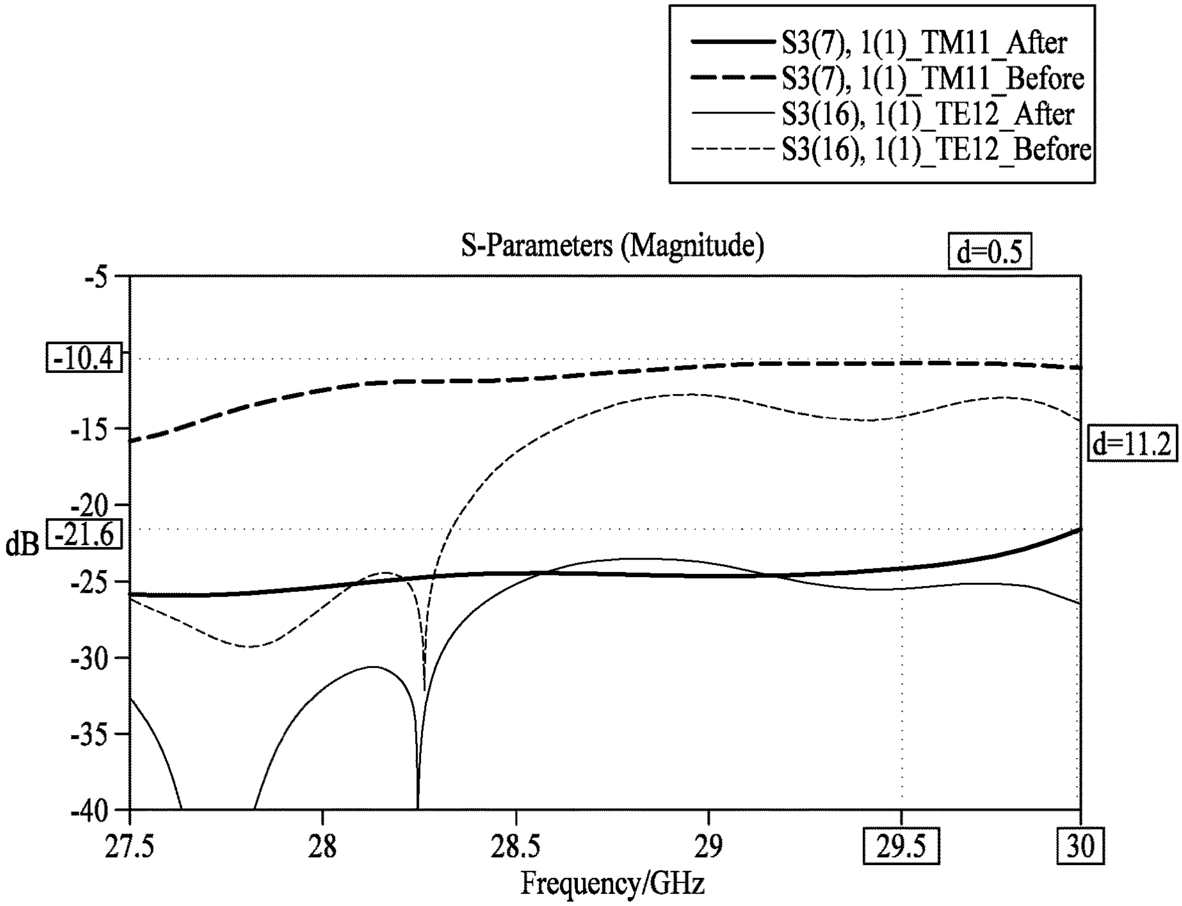
FIG. 9 is a graph showing a simulation result of improving higher order mode suppression of a second signal passing unit of the multiband diplexer according to an embodiment.

FIG. 8 is a graph showing a simulation result of improving second signal suppression entering a first signal passing unit of the multiband diplexer according to an embodiment. FIG. 9 is a graph showing a simulation result of improving higher order mode suppression of a second signal passing unit of the multiband diplexer according to an embodiment.

Referring to FIG. 8, when using the multiband diplexer 10 and the broadband antenna 20 including the multiband diplexer 10, it is shown that a Ka band frequency band signal (Rx 17.7 GHz-20.2 GHz/Tx 27.5 GHz-30 GHz) is suppressed and a Ku band frequency band signal (Rx 10.7 GHz-12.75 GHz/Tx 13.75 GHz-14.5 GHz) is passed.

Accordingly, the multiband diplexer 10 and the broadband antenna 20 including the multiband diplexer 10 may transmit and receive a dual band wireless signal by the single feed horn 300 and separate such a signal for satellite communication.

In addition, the multiband diplexer 10 and the broadband antenna 20 including the multiband diplexer 10 may separate a dual band wireless signal and suppress a higher order mode by using the multiband diplexer 10 positioned in the rear of the single feed horn 300 and including the plurality of crease elements 221 to 227, the plurality of step elements 230, the plurality of stepped elements 1110, and the plurality of protruding elements 1120.

A number of embodiments have been described above. Nevertheless, it should be understood that various modifications may be made to these embodiments. Suitable results may be achieved if the described techniques are performed in a different order, and/or if components in a described system, architecture, device, or circuit are combined in a different manner, and/or replaced or supplemented by other components or their equivalents.

Accordingly, other implementations are within the scope of the following claims.

The invention claimed is:

1. A multiband diplexer for an antenna to separate a multiband wireless signal, the multiband diplexer comprising:

a first signal passing unit connected to a side of a single feed horn of the antenna and configured to pass a first band signal of a signal received by the single feed horn; and a second signal passing unit positioned coaxially with the first signal passing unit and configured to pass a second band signal of the signal received by the single feed horn, wherein the multiband diplexer is configured to separate the first band signal and the second band signal from the signal received by the single feed horn, wherein at least one of the first signal passing unit is configured to suppress a higher order mode of the first band signal or the second signal passing unit is configured to suppress a higher order mode of the second band signal, wherein the second signal passing unit comprises:

a dielectric body; and a second band signal higher order mode suppression member comprised in a front end of the dielectric body, wherein the second band signal higher order mode suppression member comprises a plurality of crease elements formed as annular protrusions, wherein at least two of the annular protrusions are adjacent and axially spaced from one another and a diameter of the dielectric body between the adjacent annular protrusions is less than respective diameters of the adjacent annular protrusions, wherein the plurality of crease elements has a height incremental from the front end towards a rear end of the dielectric body.

2. The multiband diplexer of claim 1, wherein the second band signal higher order mode suppression member further comprises:

a plurality of step elements positioned outside the plurality of crease elements and inside a circular waveguide.

3. The multiband diplexer of claim 1, wherein the first signal passing unit comprises:

a coaxial waveguide positioned coaxially around the second signal passing unit; and a second band signal suppression member inside the coaxial waveguide.

4. The multiband diplexer of claim 3, wherein the second band signal suppression member comprises a plurality of stepped elements, wherein the plurality of stepped elements protrudes from an outside of the coaxial waveguide to an inside of the coaxial waveguide and has a height decremental from a front end to a rear end of the coaxial waveguide.

5. The multiband diplexer of claim 3, wherein the second band signal suppression member comprises a plurality of protruding elements, wherein the plurality of protruding elements is around the dielectric body and protrudes outwardly from an inside of the coaxial waveguide.

6. A broadband antenna comprising:

a reflecting board;

a single feed horn positioned in a front end of the reflecting board; and a multiband diplexer connected to the single feed horn, wherein the multiband diplexer comprises:

a first signal passing unit connected to a side of the single feed horn and configured to pass a first band signal of a signal received by the single feed horn; and a second signal passing unit positioned coaxially with the first signal passing unit and configured to pass a second band signal of the signal received by the single feed horn, wherein the multiband diplexer is configured to separate the first band signal and the second band signal from the signal received by the single feed horn and is positioned in a rear end of the reflecting board, wherein at least one of the first signal passing unit is configured to suppress a higher order mode of the first band signal or the second signal passing unit is configured to suppress a higher order mode of the second band signal, wherein the second signal passing unit comprises:

a dielectric body; and a second band signal higher order mode suppression member comprised in a front end of the dielectric body, wherein the second band signal higher order mode suppression member comprises a plurality of crease elements formed as annular protrusions, wherein at least two of the annular protrusions are adjacent and axially spaced from one another and a diameter of the dielectric body between the adjacent annular protrusions is less than respective diameters of the adjacent annular protrusions, wherein the plurality of crease elements has a height incremental from the front end towards a rear end of the dielectric body.

7. The broadband antenna of claim 6, wherein the first signal passing unit comprises:

a coaxial waveguide positioned coaxially around the second signal passing unit; and a second band signal suppression member inside the coaxial waveguide and configured to suppress a higher order mode of the first band signal.

8. The broadband antenna of claim 7, wherein the second band signal suppression member comprises:

a plurality of stepped elements; and a plurality of protruding elements, wherein the plurality of stepped elements protrudes from an outside of the coaxial waveguide to an inside of the coaxial waveguide and has a height decremental from a front end to a rear end of the coaxial waveguide, and the plurality of protruding elements is around the dielectric body and protrudes outwardly from an inside of the coaxial waveguide.

9. A multiband diplexer for an antenna to separate a multiband wireless signal, the multiband diplexer comprising:

a first signal passing unit connected to a side of a single feed horn of the antenna and configured to pass a first band signal of a signal received by the single feed horn; and a second signal passing unit positioned coaxially with the first signal passing unit and configured to pass a second band signal of a signal received by the single feed horn, wherein the multiband diplexer is configured to separate the first band signal and the second band signal from the signal received by the single feed horn, wherein at least one of the first signal passing unit is configured to suppress a higher order mode of the first band signal or the second signal passing unit is configured to suppress a higher order mode of the second band signal, wherein the first signal passing unit comprises:

a coaxial waveguide positioned coaxially around the second signal passing unit;

a second band signal suppression member inside the coaxial waveguide, wherein the second band signal suppression member comprises a plurality of stepped elements defining a stepped inner surface of the coaxial waveguide and defining an interior volume of the coaxial waveguide, wherein each stepped element of the plurality of stepped elements protrude inwardly from the coaxial waveguide into the interior volume and the plurality of stepped elements increase in diameter from a front end to a rear end of the coaxial waveguide; and a plurality of protruding elements surrounding at least a portion of a dielectric body in the interior volume, the plurality of protruding elements protruding outwardly into the interior volume, wherein the plurality of stepped elements surround the plurality of protruding elements around the dielectric body.

* * * * *